United States Patent
Suciu et al.

(10) Patent No.: US 8,740,567 B2
(45) Date of Patent: Jun. 3, 2014

(54) REVERSE CAVITY BLADE FOR A GAS TURBINE ENGINE

(75) Inventors: Gabriel L. Suciu, Glastonbury, CT (US); James D. Hill, Tolland, CT (US); Gary M. Stetson, Tolland, CT (US)

(73) Assignee: United Technologies Corporation, Hartford, CT (US)

( * ) Notice: Subject to any disclaimer, the term of this patent is extended or adjusted under 35 U.S.C. 154(b) by 855 days.

(21) Appl. No.: 12/843,832

(22) Filed: Jul. 26, 2010

(65) Prior Publication Data

US 2012/0020805 A1 Jan. 26, 2012

(51) Int. Cl.
*F01D 5/14* (2006.01)
*B23P 15/02* (2006.01)
*F01D 5/18* (2006.01)
*F01D 5/22* (2006.01)
*F01D 5/30* (2006.01)

(52) U.S. Cl.
CPC *F01D 5/147* (2013.01); *F01D 5/18* (2013.01); *F01D 5/225* (2013.01); *F01D 5/30* (2013.01); *F05D 2220/321* (2013.01)
USPC ........ 416/191; 416/192; 416/193 A; 416/232; 29/889.1

(58) Field of Classification Search
CPC .......... F01D 5/147; F01D 5/18; F01D 5/225; F01D 5/30; F05D 2220/321
USPC .............. 416/191, 192, 193 A, 232; 29/889.1
See application file for complete search history.

(56) References Cited

U.S. PATENT DOCUMENTS

| | | | |
|---|---|---|---|
| 1,748,364 A | | 2/1930 | Ray |
| 2,787,441 A | | 4/1957 | Bartlett |
| 2,966,331 A | | 12/1960 | Creek |
| 3,014,693 A | | 12/1961 | Horne |
| 3,066,910 A | | 12/1962 | Bluck |
| 3,806,276 A | | 4/1974 | Aspinwall |
| 3,930,748 A | | 1/1976 | Redman et al. |
| 4,214,355 A | * | 7/1980 | Zelahy .................. 29/889.1 |
| 4,519,745 A | | 5/1985 | Rosman et al. |
| 4,540,339 A | * | 9/1985 | Horvath .................. 416/92 |
| 4,582,467 A | | 4/1986 | Kisling |
| 5,429,877 A | * | 7/1995 | Eylon .................... 428/586 |
| 5,873,699 A | * | 2/1999 | Watson et al. ........... 415/200 |
| 6,257,828 B1 | * | 7/2001 | Bischoff-Beiermann et al. .................... 415/200 |
| 7,001,152 B2 | * | 2/2006 | Paquet et al. ............. 416/190 |
| 7,021,899 B2 | * | 4/2006 | Ferte et al. ............. 416/229 A |
| 7,029,235 B2 | | 4/2006 | Liang |

(Continued)

FOREIGN PATENT DOCUMENTS

| | | |
|---|---|---|
| EP | 1840336 A2 | 10/2007 |
| EP | 2149675 A2 | 2/2010 |
| GB | 584580 | 1/1945 |

(Continued)

OTHER PUBLICATIONS

European Search Report for European Patent Application No. 11173975.1 completed Jun. 25, 2013.

*Primary Examiner* — Igor Kershteyn
(74) *Attorney, Agent, or Firm* — Carlson, Gaskey & Olds P.C.

(57) ABSTRACT

A rotor blade for a turbine engine includes an airfoil section which extends from a platform section opposite a root section, the airfoil section defines a cavity which extends from an airfoil tip section toward a root section.

15 Claims, 4 Drawing Sheets

(56) References Cited

U.S. PATENT DOCUMENTS

| | | | |
|---|---|---|---|
| 7,033,131 B2 | 4/2006 | Schreiber | |
| 7,104,762 B2 * | 9/2006 | Dausacker et al. | 416/232 |
| 7,189,064 B2 * | 3/2007 | Helder et al. | 416/232 |
| 7,251,888 B2 | 8/2007 | Schreiber | |
| 7,438,523 B2 * | 10/2008 | Pickert et al. | 415/200 |
| 7,628,587 B2 * | 12/2009 | McFeat et al. | 416/189 |
| 2003/0228223 A1 | 12/2003 | Bunker et al. | |
| 2005/0047918 A1 * | 3/2005 | Powell | 416/233 |
| 2007/0258825 A1 * | 11/2007 | Shadbolt et al. | 416/223 R |

FOREIGN PATENT DOCUMENTS

| | | |
|---|---|---|
| GB | 602530 | 10/1945 |
| GB | 625693 | 10/1946 |
| GB | 619107 | 3/1949 |
| GB | 623041 | 5/1949 |
| GB | 2121483 | 12/1983 |
| GB | 2394751 A | 5/2004 |

* cited by examiner

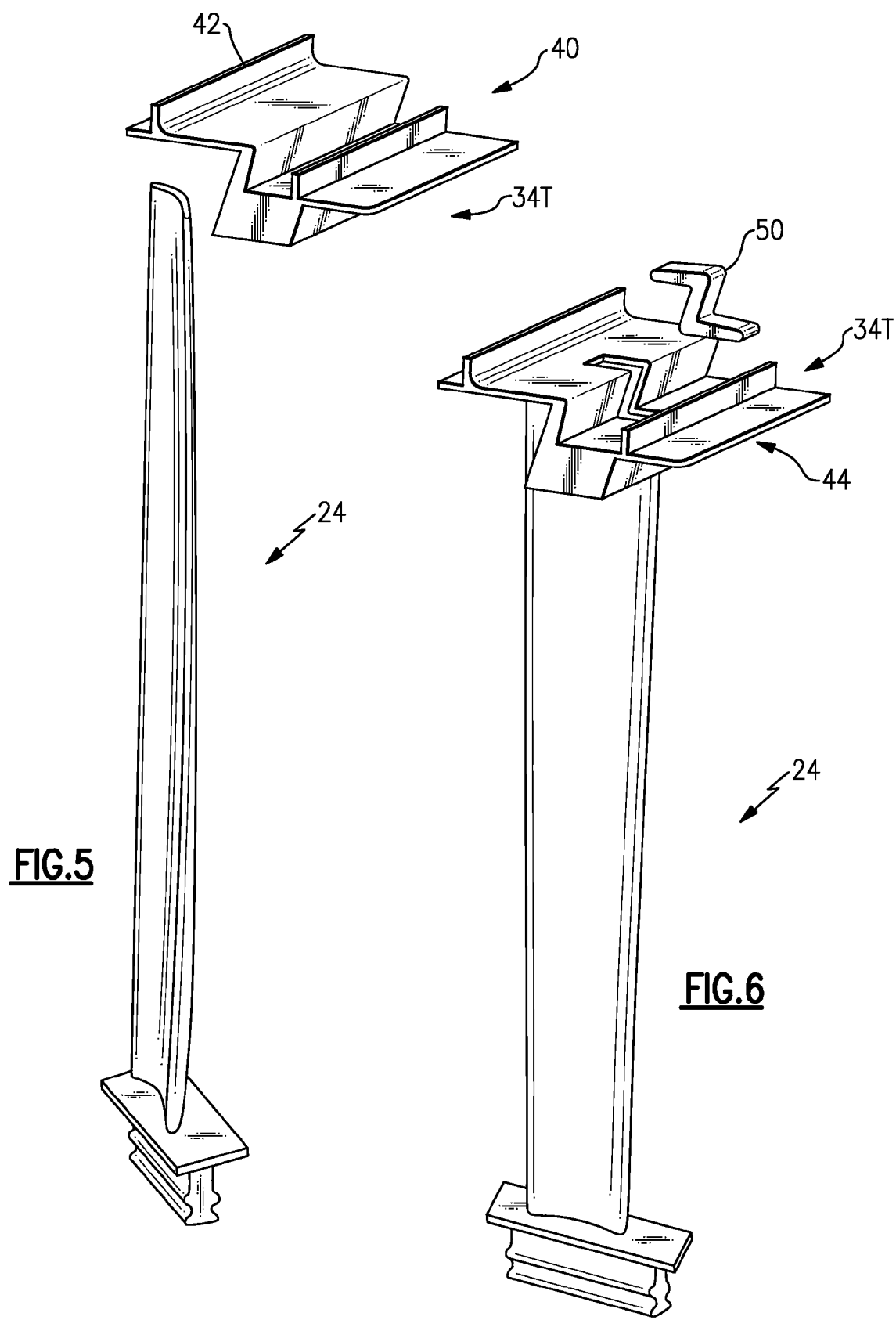

REVERSE CAVITY BLADE FOR A GAS TURBINE ENGINE

BACKGROUND

The present disclosure relates to a gas turbine engine, and more particularly to a turbine blade thereof.

Gas turbine engines often include a multiple of rotor assemblies within a fan, compressor and turbine section. Each rotor assembly has a multitude of blades attached about a circumference of a rotor disk. Each blade includes a root section that attaches to the rotor disk, a platform section, and an airfoil section that extends radially outwardly from the platform section.

When engine weight becomes a concern, emphasis is directed toward the reduction of blade weight since every one pound of weight in the set of blades is worth about three pounds of weight in the rotor disk due to centrifugal forces. Weight is typically removed from the blade by thinning airfoil walls and ribs until a minimum thickness is achieved from a manufacturing and structural standpoint.

SUMMARY

A rotor blade for a turbine engine according to an exemplary aspect of the present disclosure includes an airfoil section which extends from a platform section opposite a root section, the airfoil section defines a cavity which extends from an airfoil tip section toward a root section.

A method of forming a rotor blade according to an exemplary aspect of the present disclosure includes defining a cavity which extends from an airfoil tip section toward a root section of an airfoil section of a turbine blade.

BRIEF DESCRIPTION OF THE DRAWINGS

The various features and advantages of this disclosure will become apparent to those skilled in the art from the following detailed description of the disclosed non-limiting embodiment. The drawings that accompany the detailed description can be briefly described as follows:

FIG. 5 is an exploded view of a LPT blade; and

FIG. 6 is an exploded view of another embodiment of the LPT blade;

DETAILED DESCRIPTION

Figure 1:
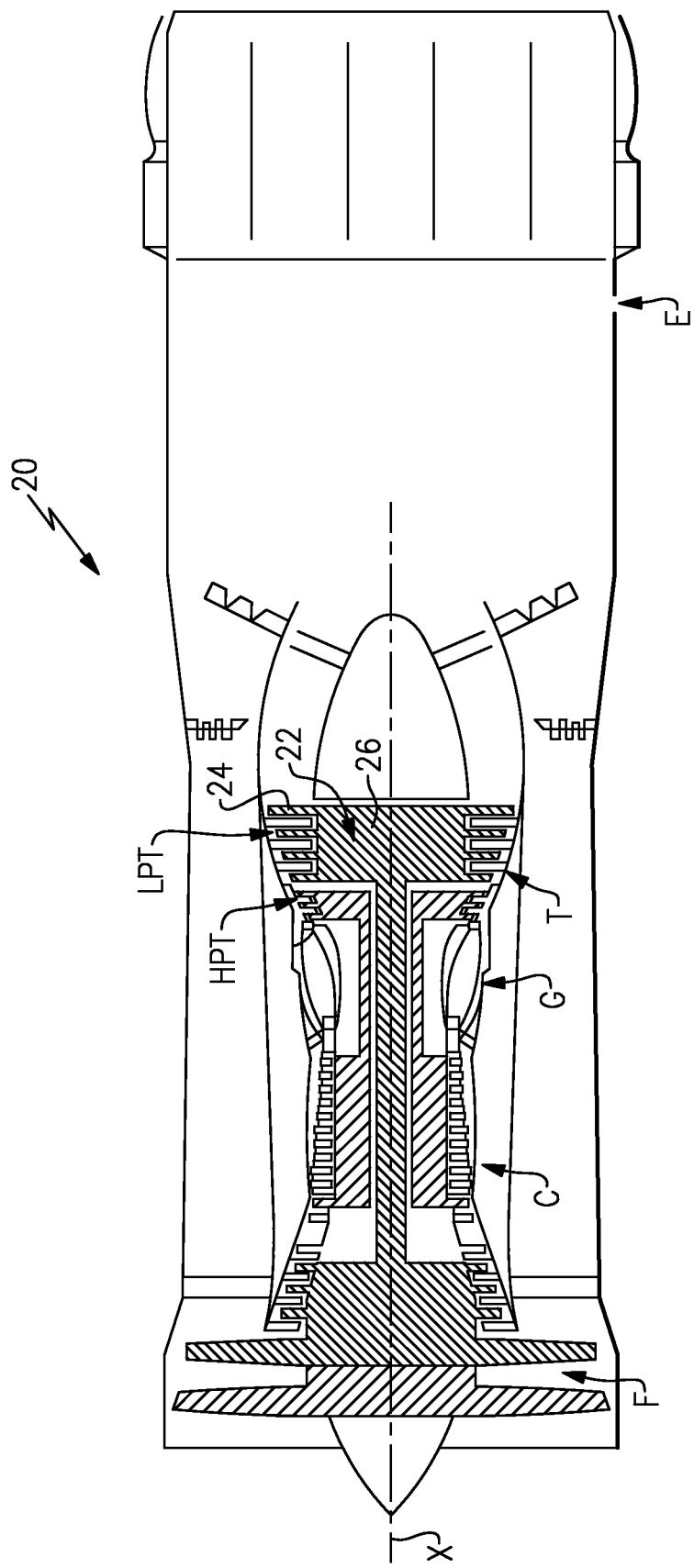
FIG. 1 is a schematic illustration of a gas turbine engine.

FIG. 1 schematically illustrates a gas turbine engine 20 which generally includes a fan section F, a compressor section C, a combustor section G, a turbine section T, an augmentor section A, and an exhaust duct assembly E. The compressor section C, combustor section G, and turbine section T are generally referred to as the core engine. An engine longitudinal axis X is centrally disposed and extends longitudinally through these sections. While a particular gas turbine engine is schematically illustrated in the disclosed non-limiting embodiment, it should be understood that the disclosure is applicable to other gas turbine engine configurations, including, for example, gas turbines for power generation, turbojet engines, high bypass turbofan engines, low bypass turbofan engines, turboshaft engines, etc.

Within and aft of the combustor section G, engine components may be internally cooled or uncooled dependant on the temperatures of the hot combustion core gases. For example, a High Pressure Turbine (HPT) of the turbine section T may be cooled, while a Low Pressure Turbine (LPT) may be uncooled. It should be understood that various cooling paths and flows may alternatively or additionally be provided.

The uncooled Low Pressure Turbine (LPT) section of the gas turbine engine 20 includes a rotor assembly 22 along the engine longitudinal axis X. The rotor assembly 22 includes a plurality of blades 24 circumferentially disposed around a respective rotor disk 26. It should be understood that a multiple of discs may be contained within each engine section and that although the LPT section is illustrated and described in the disclosed embodiment, other sections will also benefit herefrom.

Figure 2:
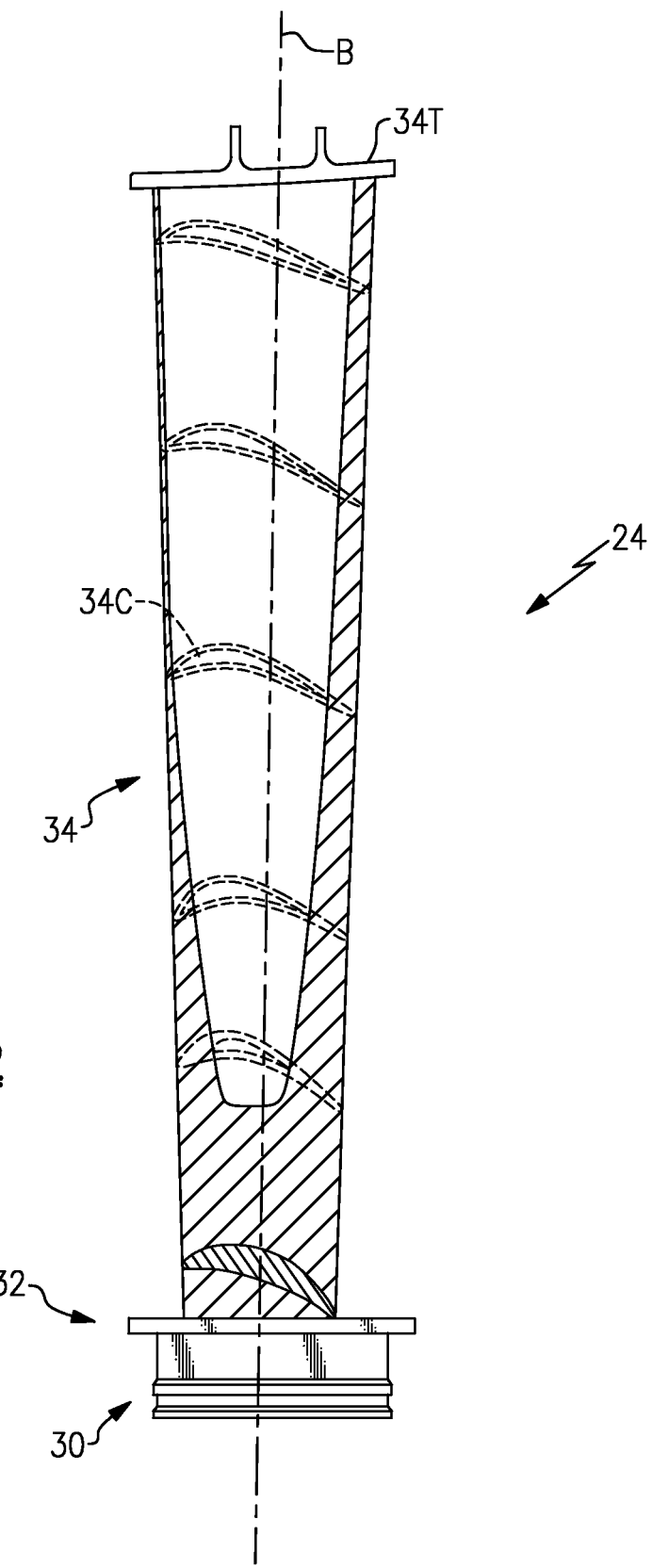
FIG. 2 is a general sectional view of a gas turbine engine LPT blade.
Figure 3:
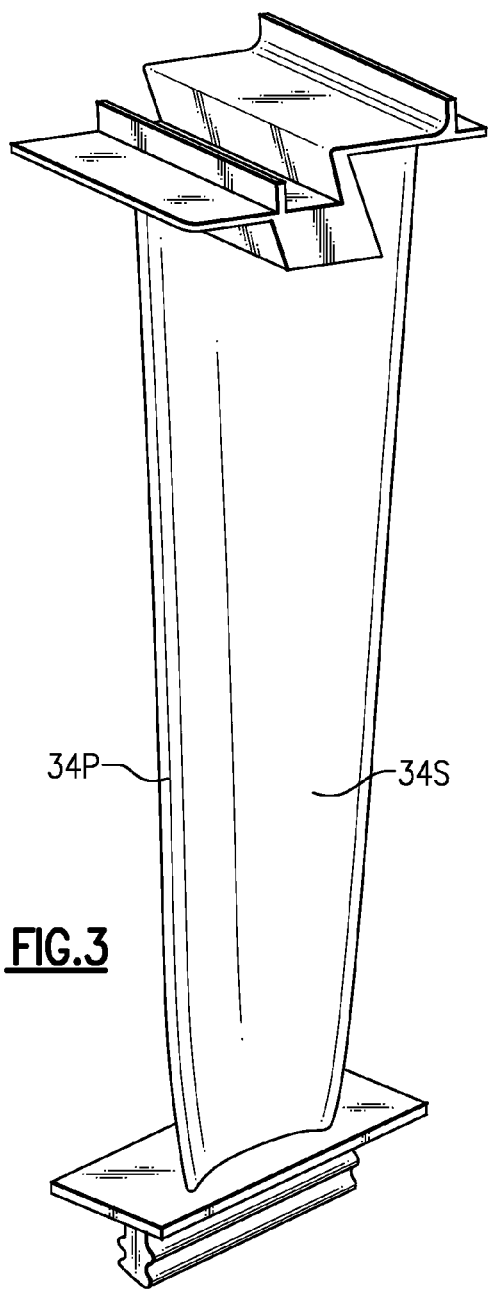
FIG. 3 is a perspective view of the LPT blade of FIG. 2.

With reference to FIG. 2, each blade 24 generally includes a root section 30, a platform section 32, and an airfoil section 34 along a longitudinal axis B. The outer edge of each airfoil section 34 is an airfoil tip section 34T which is adjacent the blade outer air seal assembly (not shown). The airfoil section 34 defines a suction side 34S and a pressure side 34P (FIG. 3).

The blade 24 is hollowed to define a cavity 34C, by casting or other conventional process, from the airfoil tip section 34T toward the root section 30. The cavity 34C may be filled with various honeycomb, rib or fin structure. Alternatively, or in addition, the cavity 34C may filled with a gas or contain a vacuum.

Wall thickness at each section (illustrated in phantom) may be determined, for example, by minimum material manufacturing limits or maximum stress allowable limits, generally whichever is less. This maintains a high stiffness to weight ratio of the airfoil for better vibration response while maintaining a nearly constant mean stress along the span.

Figure 4:
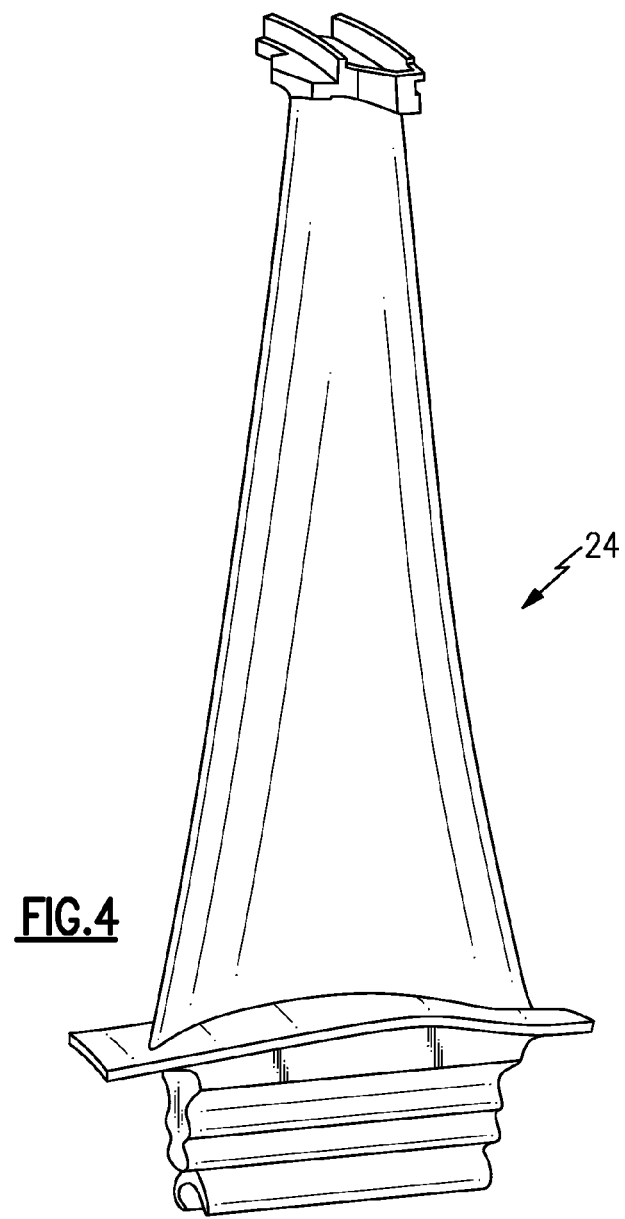
FIG. 4 is a perspective view of the LPT blade with a negative taper ratio.

The blade 24 may have a zero, positive (FIG. 3) or negative (FIG. 4) taper ratio such that the taper can be optimized for maximum efficiency. It should be understood that a positive taper ratio defines a longer chord at the airfoil tip section 34T that at the root section 30. A longer chord at the airfoil tip section 34T reduces loading with a reduced airfoil thickness at the root section 30 to minimize blockage for an overall efficiency gain.

With reference to FIG. 5, the airfoil tip section 34T receives a tip shroud 40 to close the cavity 34C. The tip shroud 40 may be attached in various manners through welding, brazing, bonding or other such permanent attachment. The tip shroud 40 includes rails 42 which define knife edge seals with stationary engine structure (not shown). The rails 42 define full annular knife seals when assembled to the rotor disk 22. That is, the rails 42 on one blade 24 interface with the rails 42 on an adjacent blade 24 to form a full turbine ring tip shroud.

With reference to FIG. 6, the airfoil tip section 34T may alternatively be formed with an integral tip shroud 44 with rails which receives a separate cover plate 50 to close the cavity 34C. That is, the cover plate 50 is sized to plug the cavity 34C and may be generally airfoil shaped. The cover plate 50 may be attached in various manners through welding, brazing, bonding or other such permanent attachment.

In addition to the performance benefits, airfoils that are hollowed from the airfoil tip section 34T toward the root section 30 facilitate a solid attachment to the rotor disk 22. A solid root section 30 provides for reduced circumferential thickness requirements and reduced potential of pitch limitations on the number of airfoils that will fit around the circumference of the rotor disk 22.

It should be understood that although a particular component arrangement is disclosed in the illustrated embodiment, other arrangements will benefit from the instant disclosure.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Many modifications and variations are possible in light of the above teachings. Non-limiting embodiments are disclosed herein, however, one of ordinary skill in the art would recognize that certain modifications would come within the scope of this disclosure. It is, therefore, to be understood that within the scope of the appended claims, the disclosure may be practiced otherwise than as specifically described. For that reason the following claims should be studied to determine the true scope and content of this disclosure.

What is claimed is:

1. A rotor blade for a turbine engine comprising:
   a platform section;
   a root section which extends from said platform section; and
   an airfoil section which extends from said platform section opposite said root section, said airfoil section defines a cavity which extends from an airfoil tip section toward said root section, wherein said root section is solid, and wherein said airfoil tip section receives a cover plate to close said cavity.

2. The rotor blade as recited in claim 1, wherein said cavity decreases toward said root section.

3. The rotor blade as recited in claim 1, wherein said cavity extends from a leading edge to a trailing edge at said airfoil tip section.

4. The rotor blade as recited in claim 1, wherein said airfoil section defines a positive taper ratio.

5. The rotor blade as recited in claim 1, wherein said rotor blade is a low pressure turbine blade.

6. The rotor blade as recited in claim 1, further comprising a rail which extends from said cover plate.

7. The rotor blade as recited in claim 6, wherein a first rail and a second rail extend from respective first and second platforms of said airfoil tip section, said first rail radially offset from said second rail, said first platform radially offset from said second platform.

8. The rotor blade as recited in claim 1, wherein said cover plate completely closes said cavity.

9. A method of forming a rotor blade comprising:
   defining a cavity which extends from an airfoil tip section toward a root section of an airfoil section of a turbine blade, wherein said root section solid, and wherein said airfoil tip section receives a cover plate to close said cavity.

10. The method as recited in claim 9, further comprising:
    defining a wall thickness about the cavity with respect to a minimum material manufacturing limit.

11. The method as recited in claim 9, further comprising:
    defining a wall thickness about the cavity with respect to a maximum stress allowable limit.

12. The method as recited in claim 9, further comprising:
    defining a wall thickness about the cavity with respect to a minimum material manufacturing limit or maximum stress allowable limit, whichever is less.

13. The method as recited in claim 9, wherein said cover plate completely closes said cavity.

14. A rotor blade for a turbine engine comprising:
    a platform section;
    a root section which extends from said platform section; and
    an airfoil section which extends from said platform section opposite said root section, said airfoil section defines a cavity which extends from an airfoil tip section toward said root section, wherein said airfoil tip section receives a cover plate to close said cavity;
    wherein a first rail and a second rail extend from respective first and second platforms of said airfoil tip section, said first rail radially offset from said second rail, said first platform radially offset from said second platform; and
    wherein said cover plate is provided between said first rail and said second rail to cover an opening in said first and second platforms, and to completely close said cavity.

15. The rotor blade as recited in claim 14, wherein said cover plate is substantially Z-shaped.

* * * * *